United States Patent Office 2,783,276
Patented Feb. 26, 1957

2,783,276

PREPARATION OF GUANIDINE SALTS AND SUBSTITUTED GUANIDINE SALTS

Leslie G. Boatright, Stamford, Conn., and Johnstone S. Mackay, Pittsburgh, Pa., assignors to American Cyanamid Company, New York, N. Y., a corporation of Maine No Drawing. Application November 22, 1955, Serial No. 548,526

12 Claims. (Cl. 260—564)

The present invention is directed to the preparation of guanidine salts, both guanidine and N-alkyl substituted guanidines. As such, this application constitutes a continuation-in-part of our co-pending applications for United States Letters Patent, Serial Nos. 381,127 and 381,137, both filed September 18, 1953, now abandoned.

It has been found that when a mixture of a urea, an ammonium salt, and an inert, inorganic, heat-stable, highly porous adsorbent of high surface area (e. g., a silica gel) is heated at 150°–300° C., a guanidine salt having the same anion as the ammonium salt is formed on the adsorbent and can be recovered by procedures customary in the art.

The following examples illustrate the invention:

EXAMPLE 1

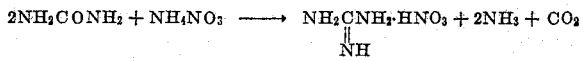

An intimate mixture of 60 g. of urea, 25 g. of silica gel and 40 g. of ammonium nitrate was heated at 180° C. for 1 hour after which the reaction mixture was poured into about 550 ml. of cold water. The resultant slurry was stirred and filtered. The solid residue consisted of the original silica gel, whereas the filtrate contained in solution 20.5 g. of unreacted urea and guanidine nitrate equivalent to 6.25 g. of guanidine free base. Subsequently all the guanidine salt was recovered from the aqueous solution by fractional crystallization under reduced pressure.

EXAMPLE 2

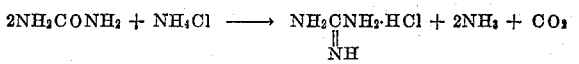

Following the procedure of the preceding example, 50 g. of silica gel, 54 g. of ammonium chloride and 60 g. of urea were mixed and heated at 180° C. for 1 hour. The product was worked up as in Example 1 yielding guanidine hydrochloride equivalent to 6.06 g. of guanidine free base. 26 g. of urea was recovered unreacted.

EXAMPLE 3

54 g. of ammonium chloride, 60 g. of urea and 25 g. of silica gel were heated at 180° C. for 2 hours. The reaction mass was worked up as in the preceding examples to yield 9.9 g. of guanidine hydrochloride.

The adsorbent

It has been found that virtually any inert adsorptive material of high internal surface area and/or volume can be adapted to serve as a "catalyst" in the reaction of urea with an ammonium salt to form the corresponding guanidine salt. The action appears to be predominantly physical, and is apparently induced best by materials of high surface area in which a considerable amount of the surface is actually in the form of the walls of innumerable sub-microscopic capillaries. The activated oxide gels of the amphoteric elements qualify admirably in this respect. For example, it is well known how to prepare gels of silica and alumina such that the internal volume of a given particle is considerably more than half the apparent volume of the particle. The same techniques have been widely utilized in the past for preparing activated gels of titania, zirconia, thoria, and the like.

The structures of gels of silica, silica-alumina and the like can be varied by various pre-treatments to give materials having predominantly pores of a large size or any intermediate diameter from 60 to 70 A. to very low values. Also, the gels in question can have surface areas covering the range of 180–650 m.$^2$/g. Gels having specific surfaces of 600 m.$^2$/g. and pore volumes of 0.9 cc./g. have been found satisfactory as have gels having surfaces of 450 m.$^2$/g. and pore volumes of 0.26 cc./g. These are not to be construed as limits of workability of the gel but only as examples of the variations in structure possible.

As normally prepared, the activated catalysts may carry 2–20% by weight of adsorbed water. It is neither necessary nor desirable to remove all of this water (as by preliminary strong heating). In fact, heating silica gel overnight in a muffle furnace at 600° C. will ordinarily remove only ½–⅔ of its adsorbed water. However, whatever water is not removed by preliminary heating is eventually nearly all removed by hydrolytic reactions with reactants on the silica, yielding $NH_3$ and $CO_2$.

Still further, it also has been found that when a mixture of an N-alkyl urea, an ammonium salt, and an inert, inorganic heat-stable highly porous adsorbent of high surface area (e. g., silica gel) is similarly prepared and heated at 175°–300° C., an N-alkyl guanidine salt having the same anion as the ammonium salt is formed on the adsorbent and can be recovered.

The following example illustrates this feature of the invention:

EXAMPLE 4

A mixture of 10 parts of N,N-diethylurea, 10 parts of ammonium chloride, and 50 parts of dry silica gel was heated for 1 hour at 205°–220° C. to form a reaction mass containing N,N-diethyl guanidine hydrochloride. The reaction mixture was cooled, washed with water (250 parts) and added to 1000 parts of saturated ammonium picrate solution to recover the product as the insoluble picrate. N,N-diethylguanidine picrate (M. P. 220° C.) precipitated immediately and was recovered in good yield.

While silica gel is used in the foregoing examples in this specification, it is to be understood that this use is as a representative of the general class of inert, inorganic, heat-stable, porous adsorbent materials described above.

EXAMPLE 5

In another experiment 10 g. of urea, 10 g. of ammonium phosphate, and 50 g. predried zirconia gel were mixed and heated at 220° C. for 2 hours. About 2 g. of guanidine phosphate was leached from the reaction mass.

According to the present invention, a variety of different guanidine salts may be prepared. For example, the ammonium salt used may be varied. However, the salt must not decompose at too low a temperature. Otherwise, substantially any ammonium salt that can be alone heated to 150° C. without complete decomposition can be used to prepare the corresponding guanidine salt by the process of this invention. The process is particularly suitable for the preparation of the guanidine salts of inorganic acids, e. g., nitrate, phosphate, chloride and the like and of the organic acids, e. g., oxalate, citrate, acetate and the like.

Substantially any N-alkylurea may be used, e. g., N-methylurea, N,N-dimethylurea, N-ethylurea, N,N-dibutylurea, N-hexylurea, and the like. When using the dialkyl substituted urea, best results are obtained when the two alkyl groups are on the same urea nitrogen atom.

The ratio of materials is not critical. Some guanidine salt has been obtained with relatively large amounts of urea or a N, alkyl urea and small amounts of ammonium salt and silica gel. Excesses of ammonium salt with minor amounts of the urea and silica gel are also operable. The relative cost of the N-alkyl urea and the ammonium salt may be a factor in determining which of these two materials may profitably be in excess. In any event, however, for most efficient utilization of materials the ratio should be chosen so that about 2–4 moles of urea is reacted with 1–2 moles of ammonium salt.

With reference to the amount of silica gel, enough should be used so that the N-alkyl urea-ammonium salt mix is substantially absorbed when heated, thereby reducing side reactions of molten material not in contact with the absorbent surface. On the other hand, the use of very large amounts of absorbent, while not affecting the ultimate guanidine or N-alkyl guanidine yield, presents a leaching problem. A weight ratio of silica gel: (urea plus ammonium salt mix) in the range of about 10:1 to 1:10 is preferred.

Although the reaction may be carried out at some 150°–300° C., a temperature range of from about 175° to about 225° C. is preferred when using urea and from about 200° to about 225° C. when using an N-alkyl urea. At these temperatures reaction is usually substantially completed within an hour or two. In the examples above pressure was substantially atmospheric. However, if so desired both sub-atmospheric and super-atmospheric pressures may be used.

We claim:

1. A method of preparing guanidine salts which comprises the steps of: forming a reactant mixture comprising an inert, inorganic, heat-stable porous adsorbent gel, a urea selected from the group consisting of urea, and the N-alkyl and N,N-dialkyl ureas wherein the alkyl radicals contain 1–6 carbon atoms a member of the group consisting of the nitrate, phosphate, chloride, citric, acetate and oxalate salts of ammonia, the ratio of the weight of absorbent gel to the total weight of the urea plus the ammonium salt ranging from about 1:10 to about 10:1, heating said reactant mixture at a temperature of from about 175°–300° C. for sufficient time to form a guanidine salt, and collecting so-formed guanidine salt.

2. The method according to claim 1 in which the temperature range is from about 175° to about 225° C.

3. The method according to claim 1 in which heating is carried out under substantially atmospheric pressure.

4. The method of preparing guanidine nitrate according to claim 1 in which the urea is urea and the ammonium salt is ammonium nitrate.

5. The method of preparing guanidine chloride according to claim 1 in which the urea is urea and the ammonium salt is ammonium chloride.

6. The method of preparing guanidine phosphate according to claim 1 in which the urea is urea and the ammonium salt is ammonium phosphate.

7. The method of preparing an N-alkyl guanidine hydrochloride that comprises forming a substantially anhydrous mixture comprising an N-alkyl urea, ammonium chloride and an inert, inorganic, heat-stable porous absorbent and treating said mixture at from about 175° C. to about 300° C.

8. The method according to claim 7 in which the reaction is carried out at substantially atmospheric pressure.

9. The method according to claim 7 in which the temperature is about 200°–225° C.

10. The method of preparing N,N-diethyl guanidine hydrochloride that comprises bringing together a mixture of N,N-diethyl urea, ammonium chloride and an inert, inorganic, heat-stable porous absorbent and heating said mixture at a temperature of about 200°–225° C.

11. The method of preparing a reaction mass comprising N,N-diethylguanidine hydrochloride that comprises forming an intimate, substantially-anhydrous mixture of N,N-diethylurea, ammonium chloride, and silica gel and heating said mixture at a temperature of about 205–220° C.

12. The method according to claim 11 in which the reaction is carried out at substantially atmospheric pressure.

No references cited.